(12) United States Patent
Chou et al.

(10) Patent No.: US 6,599,604 B2
(45) Date of Patent: Jul. 29, 2003

(54) OPTICAL DATA RECORDING MEDIUM

(75) Inventors: Lih-Hsin Chou, 101, Sec. 2, Kuang-Fu Rd., Hsinchu (TW); Po-Yuan Hsu, Kaohsiung (TW); I-Chen Chung, Taipei (TW); Duei-Cherng Wang, Changhua (TW)

(73) Assignee: Lih-Hsin Chou, Hsinchu (TW)

( * ) Notice: Subject to any disclaimer, the term of this patent is extended or adjusted under 35 U.S.C. 154(b) by 0 days.

(21) Appl. No.: 09/902,437

(22) Filed: Jul. 10, 2001

(65) Prior Publication Data

US 2002/0090486 A1 Jul. 11, 2002

(30) Foreign Application Priority Data

Jan. 10, 2001  (TW) ........................................ 90100559 A

(51) Int. Cl.$^7$ ................................................ B32B 3/02
(52) U.S. Cl. ...................... 428/64.1; 428/64.5; 428/402; 430/270.12
(58) Field of Search ................................ 428/64.1, 64.4, 428/64.5, 698, 702, 913, 402; 430/270.12, 495.1, 945; 369/283, 288

(56) References Cited

U.S. PATENT DOCUMENTS

| | | | | |
|---|---|---|---|---|
| 4,477,555 A | * | 10/1984 | Oba ............................. 430/273 |
| 5,080,947 A | * | 1/1992 | Yamada ........................ 428/64 |
| 5,889,756 A | * | 3/1999 | Ichihara .................... 369/275.2 |
| 2001/0022769 A1 | * | 9/2001 | Waki .......................... 369/172 |

\* cited by examiner

*Primary Examiner*—Elizabeth Mulvaney
(74) *Attorney, Agent, or Firm*—Ladas & Parry

(57) ABSTRACT

An optical data recording medium includes a light transmittable plastic substrate, and a recording layer formed on the plastic substrate and containing an inorganic compound body and metal particles dispersed in the inorganic compound body. The inorganic compound body is made from a material selected from a group consisting of a metal oxide and a metal nitride.

9 Claims, 1 Drawing Sheet

US 6,599,604 B2

OPTICAL DATA RECORDING MEDIUM

CROSS-REFERENCE TO RELATED APPLICATION

This application claims priority of Taiwan patent Application No. 90100559, filed on Jan. 1, 2001.

BACKGROUND OF THE INVENTION

1. Field of the Invention

This invention relates to an optical data recording medium, more particularly to an optical data recording medium having a recording layer that contains an inorganic compound body and metal particles dispersed in the inorganic compound body.

2. Description of the Related Art

U.S. Pat. No. 5,252,370 discloses an optical data recording medium which is capable of reproduction according to the CD standard and which includes a recording layer of silver oxide or iron nitride on a substrate that is made from a resin material. A dielectric layer of silicon oxide and a metal reflective layer are stacked on the recording layer. The metal oxide or the metal nitride of the recording layer decomposes and releases gas, and the substrate is softened and is formed with recesses as a result of the gas released by the recording layer when irradiated with a laser beam. The recesses in the substrate result in lowering of the reflectivity thereat, thereby providing the optical data recording medium with a reproduction capability according to the CD standard. However, the aforesaid optical data recording medium is disadvantageous in that it requires a metal reflective layer so as to be provided a sufficient reflectivity. The entire disclosure of the U.S. Pat. No. 5,252,370 is incorporated herein by reference.

SUMMARY OF THE INVENTION

The object of the present invention is to provide an optical data recording medium that includes a recording layer on a substrate and that dispenses with the aforementioned metal reflective layer of the prior art.

According to the present invention, an optical data recording medium comprises: a light transmittable plastic substrate; and a recording layer formed on the plastic substrate and containing an inorganic compound body and metal particles dispersed in the, inorganic compound body. The inorganic compound body is made from a material selected from a group consisting of a metal oxide and a metal nitride.

BRIEF DESCRIPTION OF THE DRAWINGS

In drawings which illustrate an embodiment of the invention.

DETAILED DESCRIPTION OF THE PREFERRED EMBODIMENT

Figure 1:
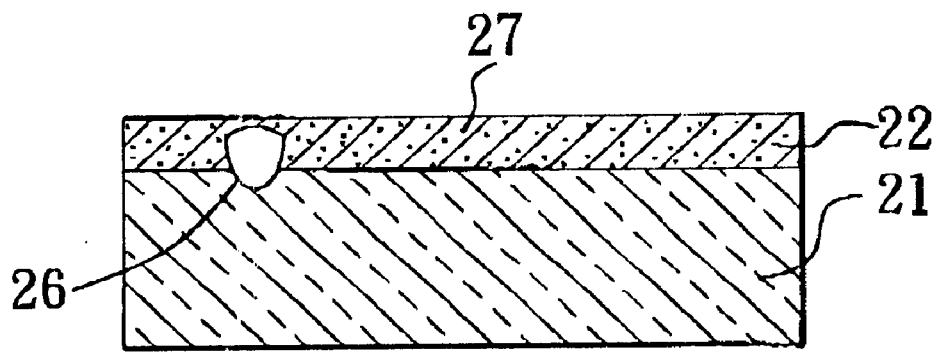
FIG. 1 is a cross-sectional view illustrating a preferred embodiment of an optical data recording medium of this invention, which includes a recording layer on a plastic Substrate.

FIG. 1 illustrates a write-once type optical data recording medium that embodies this invention. The optical data recording medium includes a recording layer 22 on a light transmittable plastic substrate 21, and can be recorded or written by formation of pits or recesses 26 in the plastic substrate 21.

The recording layer 22 preferably has a thickness in a range of from about 30 nm to 2500 nm, and contains an inorganic compound body and metal particles 27 dispersed in the inorganic compound body. The inorganic compound body is made from a material selected from a group consisting of a metal oxide and a metal nitride. The metal oxide is selected from a group consisting of silver oxide, zirconium oxide, manganese oxide, and palladium oxide, and contains 5 to 60 atomic percent oxygen, which can be measured by Auger Spectroscopy or Secondary Ion Mass Spectroscopy (SIMS). The metal nitride is selected from a group consisting of silver nitride and iron nitride, and contains 5 to 60 atomic percent nitrogen. The presence of the metal particles 27 in the inorganic compound body can be detected via X-ray diffraction.

Heat measurements of the powdered silver oxide via Thermal Gravimetry Analyzer (TGA) show that the powdered silver oxide decomposes and releases oxygen at a temperature of about 350° C.

The recording layer 22 can be formed via magnetron sputtering techniques with a reactive gas, such as oxygen and nitrogen. The sputtering pressure is in a range of from 2 to 20 milli-torrs. The sputtering power is about 150 W. The plastic substrate 21 is held at a temperature of about room temperature during the sputtering process.

The plastic substrate 21 is made from a resin material selected from a group consisting of acrylic resins, polycarbonate resins, epoxy resins, and polyolefin resins. Preferably, the recording layer 22 has a hardness greater than that of the plastic substrate 21.

Preferably, the inorganic compound body of the recording layer 22 decomposes and releases oxygen or nitrogen at a temperature greater than 350° C., whereas the plastic substrate 21 is softened at a temperature in a range of from 80° C. to 300° C. so as to permit formation of recesses 26 in the plastic substrate 21 as a result of oxygen or nitrogen released by the inorganic compound body and so as to permit a sharp change in reflectivity at positions where the recesses 26 are formed. The recording of the optical data recording medium can be carried out by irradiating a laser beam with an energy density in a range of 7 to 17 mW through the substrate 21 into the recording layer 22 which absorbs energy from the laser beam so as to release oxygen or nitrogen to form the recesses 26.

Preferably, the thus formed recording layer 22 provides the optical data recording medium of this invention with a reflectivity greater than 40% in response to a wavelength of 300 to 900 nm so as to meet the CD or DVD standard.

Preferably, the recording layer 22 contains 1 to 30 wt % of the metal particles 27.

Figure 2:
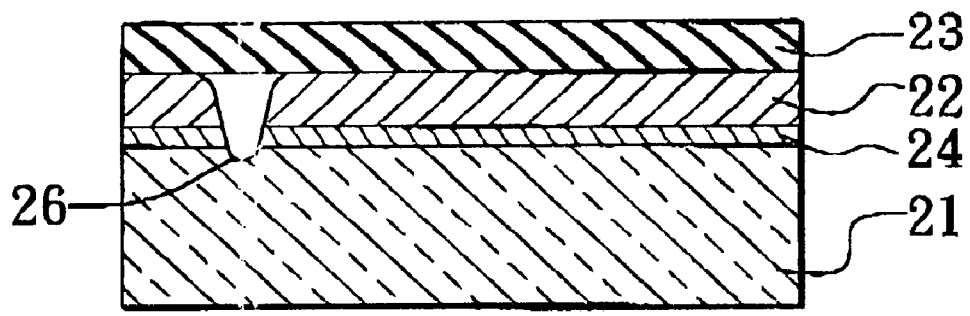
FIG. 2 is a cross-sectional view illustrating the preferred embodiment of the optical data recording medium of this invention, which can optionally and additionally include a metal layer and a dielectric layer.

Referring to FIG. 2, the optical data recording medium of this invention can further include a metal layer 24 disposed between the recording layer 22 and the plastic substrate 21 so as to enhance recording sensitivity thereof. The metal layer 24 is preferably a low melting point metal selected from a group consisting of Sn, Zn, Pb, Bi, Tl, Te, Se, Al, Ga, Ge, Cd, and alloys thereof, and has a thickness in a range of from 5 to 300 angstroms.

The optical data recording medium of this invention can further include a dielectric layer 23 disposed on the recording layer 22 for enhancing the recording sensitivity thereof and for adjusting the reflectivity thereof. The dielectric layer 23 can be made from a material selected from a group consisting of silicon oxide, zirconium oxide, titanium oxide, tantalum oxide, magnesium fluoride, aluminum fluoride, aluminum nitride, silicon nitride, SiON, AlON, zinc sulfide, and mixtures thereof.

With the presence of the metal particles 27 in the inorganic compound body of the recording layer 22, the reflective layer used in the prior art can be dispensed with.

With the invention thus explained, it is apparent that various modifications can be made without departing from the spirit of the present invention. It is therefore intended that the invention be limited only as recited in the appended

We claim:

1. An optical data recording medium, comprising:

a light transmittable plastic substrate; and a recording layer formed on said plastic substrate and containing an inorganic compound body and metal particles dispersed in said inorganic compound body, said inorganic compound body being made from a material selected from a group consisting of a metal oxide and a metal nitride, wherein said recording layer contains 5 to 50 atomic percent oxygen when said inorganic compound is made from said metal oxide, and contains 5 to 50 atomic percent nitrogen when said inorganic compound is made from said metal nitride, and wherein said recording layer provides said optical data recording medium with a reflectivity greater than 40% in response to a wavelength in a range of from 300 to 900 nm.

2. The optical data recording medium of claim 1, wherein said metal oxide is selected from a group consisting of silver oxide, zirconium oxide, manganese oxide, arid palladium oxide.

3. The optical data recording medium of claim 1, wherein said metal nitride is selected from a group consisting of silver nitride and iron nitride.

4. The optical data recording medium of claim 1, wherein said recording layer contains 1 to 30 wt % of said metal particles.

5. The optical data recording medium of claim 1, wherein said recording layer has a thickness in a range of from 30 to 2500 nm.

6. The optical data recording medium of claim 1, wherein said plastic substrate is made from a resin material selected from a group consisting of acrylic resins, polycarbonate resins, epoxy resins, and polyolefin resins.

7. An optical date recording medium comprising:

a light transmittable plastic substrate;

a recording layer formed on said plastic substrate and containing an inorganic compound body and metal particles dispersed in said inorganic compound body, said inorganic compound body being made from a material selected from a group consisting of a metal oxide and a metal nitride; and a metal layer disposed between said plastic substrate and said recording layer.

8. The optical data recording medium of claim 7, wherein said metal layer is a low melting point metal selected from a group consisting of Sn, Zn, Pb, Bi, Tl, Te, Se, Al, Ga, Ge, Cd, and alloys thereof.

9. The optical data recording medium of claim 7, wherein said metal layer has a thickness in a range of from 5 to 300 angstroms.

* * * * *